United States Patent
Moilanen

(10) Patent No.: US 7,231,217 B2
(45) Date of Patent: Jun. 12, 2007

(54) DETERMINING NEIGHBOUR LISTS

(75) Inventor: Jani Moilanen, Helsinki (FI)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 10/733,819

(22) Filed: Dec. 12, 2003

(65) Prior Publication Data

US 2004/0166876 A1     Aug. 26, 2004

Related U.S. Application Data

(63) Continuation-in-part of application No. 10/331,942, filed on Dec. 31, 2002.

(51) Int. Cl.
*H04Q 7/20*     (2006.01)
(52) U.S. Cl. .................. 455/456.1; 455/67.11; 455/456.5
(58) Field of Classification Search ........... 455/456.1, 455/67.11, 456.4; 342/464
See application file for complete search history.

(56) References Cited

U.S. PATENT DOCUMENTS

| 5,724,243 | A | * | 3/1998 | Westerlage et al. ...... 455/456.5 |
| 6,140,964 | A | * | 10/2000 | Sugiura et al. ............. 342/464 |
| 6,430,397 | B1 | * | 8/2002 | Willrett .................... 455/67.11 |
| 6,490,454 | B1 | * | 12/2002 | Kangas et al. ........... 455/456.1 |

* cited by examiner

*Primary Examiner*—Joseph Feild
*Assistant Examiner*—Kiet Doan
(74) *Attorney, Agent, or Firm*—Squire, Sanders & Dempsey L.L.P.

(57) ABSTRACT

A method and system for compiling neighbor lists in a mobile communication network is described. A test signal is transmitted from one base station (BTS) to a set of location measurement units (LMU), one LMU preferably being associated with the transmitting BTS. The received signal is time stamped at each LMU and the transmission times calculated from the time stamps. The transmission times are compared and the list is compiled from those LMUs with close or the same transmission times.

20 Claims, 3 Drawing Sheets

DETERMINING NEIGHBOUR LISTS

CROSS REFERENCE TO RELATED APPLICATION

This is a Continuation-in-Part of application Ser. No. 10/331,942 filed Dec. 31, 2002. The disclosure of the prior application is hereby incorporated by reference herein in its entirety.

BACKGROUND OF THE INVENTION

1. Field of the Invention

The present invention relates to a method of compiling a list of usable neighbour base stations measurable by a location measurement unit (LMU), to a serving measurement location centre for implementing the method and to a computer program.

2. Description of the Related Art

In a mobile communication network comprising a plurality of base stations, it is known to determine the location of a mobile station in the network in the following way. A mobile station MS receives signals transmitted via base stations and can determine the time difference between receptions. These are called observed time differences (OTD). The synchronisation difference between transmissions from the base stations is called the real time difference (RTD). If both RTD and OTD are known, a so-called geometrical time difference (GTD) can be determined from the equation:

$$GTD = OTD - RTD \qquad \text{Equation 1}$$

To determine the position of a mobile, take the example of three base stations, a location measurement unit and a mobile station. A serving mobile location centre (SMLC) in the network implements the location measurement technique in conjunction with the LMUs associated with the base stations. The LMU determines (or more precisely SMLC determines based on the measurements from the LMU) a first RTD and the mobile station identifies a first OTD between a first pair of base stations. Then, a second RTD is determined by the SMLC using the LMU measurements from a second pair of base stations, and the mobile station determines a second OTD between the second pair of base stations. A positional algorithm implemented at the SMLC takes the first set of RTD and OTD measurements and determines the first GTD using equation 1. This GTD, when taken with the geographical coordinates of the base stations of the first pair can be used to define a hyperbolic line on which the mobile resides. Similarly, the second set of RTD and OTD measurements is taken to determine a second GTD which, when taken with the geographic coordinates of the base stations of the second pair defines a second hyperbolic line. The location of the mobile can the be approximated by considering where the two hyperbolic lines intersect.

A first way of determining the RTD is for the LMU to measure the OTDs and then to calculate the RTD from equation 1 because the coordinates of the LMUs and the base stations are known (i.e. the GTD is known).

Another approach is for the LMUs to have a common accurate clock (such as GPS) to allow the arrival time of signals to be timestamped. This is sometimes called OAT (observed absolute time). When the distance between an LMU and an associated BTS is reduced from OAT, an estimate for the time when the signal was transmitted is obtained. This timestamp is called AT (absolute time). The RTD value for any pair of base stations can be simply calculated as the difference between the corresponding two absolute time (AT) values.

This calculation can be carried out either in the network itself, that is in the serving mobile location centre, or at the mobile. In the latter case, the RTD and the geographical coordinates of the base stations are transmitted to the mobile station.

Such a location measurement technique is managed by SMLC in conjunction with the location measurement units associated with the base stations. It will be appreciated that it is not necessary to have an LMU associated with each base station. Each LMU can measure any base station within its range over the air interface. Also, it has a physical or air interface connection to one base station to allow it to communicate with the SMLC. To achieve reliable measurements of geographic locations of mobile stations, it is important to know which base stations can usefully be used to provide the necessary measurement. In current networks supporting location based service, so-called neighbour (nbor) lists are held. These neighbour lists define for each target LMU a group of adjacent base stations that can be used to make measurements for determining the geographic location of a mobile station. Currently, such neighbour lists are manually created by experienced field engineers and depending on the network configuration can take several weeks. An experienced field engineer must basically determine which adjacent base stations to a target LMU can obtain accurate timing measurement. In order to determine this, a field engineer must determine if received signals from adjacent base stations suffer from multipath and/or interference. Firstly, an initial neighbour list can be created by a field engineer by analysing the network layout, for example from looking at the distance of the adjacent base stations to the target base station, antenna directions or width, linear side, topography and frequency plans.

Next, the neighbour list can be verified by analysing measured signals from adjacent LMUs to the target base station. Verification of this list can be carried out by analysing signal measurements collected by adjacent LMUs, by looking at signal strength, bit error rate and optimisation measurements, for example.

Not only is such a technique time consuming and labour intensive, but it also needs to be carried out each time there is a change in the network, for example frequency re-allocation or deployment of new equipment.

It is an object of the invention to enable a list of usable location measurement units to be compiled without reliance on manual activities and personal expertise.

SUMMARY OF THE INVENTION

One aspect of the invention provides a method of compiling a list of usable neighbour location measurement units in a mobile communications network comprising a plurality of transmitters with a plurality of location measurement units, the method comprising: (a) receiving a signal from one of said transmitters at each of a set of said location measurement units and time stamping the signal with the arrival time at each location measurement unit; (b) determining from the arrival time at each location measurement unit and its distance from the transmitting transmitter the transmission time; (c) comparing the transmission times determined for each of the location measurement units and placing on the list only those location measurement units whose transmission times fall in a predetermined range of one another.

In a telecommunications network, the transmitter is located at a base station (BTS). A BTS can have more than one transmitters transmitting over different channels.

It will be appreciated that in a practical implementation the signal can be constituted by for example an ordinary control signal from the BTS, such as the BCCH signal.

It will be appreciated that not all BTSs are associated with their own LMU—there may be more BTSs than LMUs in a real life network Another aspect of the invention provides a serving measurement location centre in a mobile communications network having a plurality of transmitters with a plurality of location measurement units, the centre comprising: a processor arranged to receive from each of a set of the location measurement units receiving a signal from one of the transmitters a transmission time calculated at the respective measurement units; a store holding a list of useful location measurement units; said processor being programmed to compare the transmission times determined at each of the location measurement units and to place on the list only the location measurement units whose determined transmission times fall in a predetermined range of one another.

A further aspect of the invention provides a computer program product comprising program code means which when executed on a processor cause the processor to to receive from each of a set of location measurement units associated with the base stations a transmission time calculated at the respective location measurement unit, and to further cause the processor to compare the transmission times determined at each of the location measurement units and to place on a list of usable neighbour location measurement units only those whose transmission times fall in a predetermined range of one another.

Preferably, the method steps are carried out for each of the base stations in the network in a predetermined sequence and at predetermined time intervals. By automating compilation of the neighbour lists, it is possible to compile them periodically, for example at night when traffic in the networks is low, without involving a huge amount of work, time and expertise. Thus, the neighbour list are "self-defined" without action by a user, and because they can easily be done periodically in an automated fashion, they can take into account continuing changes in the network.

For a better understanding of the invention and to show how the same may be carried into effect reference will now be made by way of example to the accompanying drawings.

DESCRIPTION OF THE PREFERRED EMBODIMENT

Figure 1:
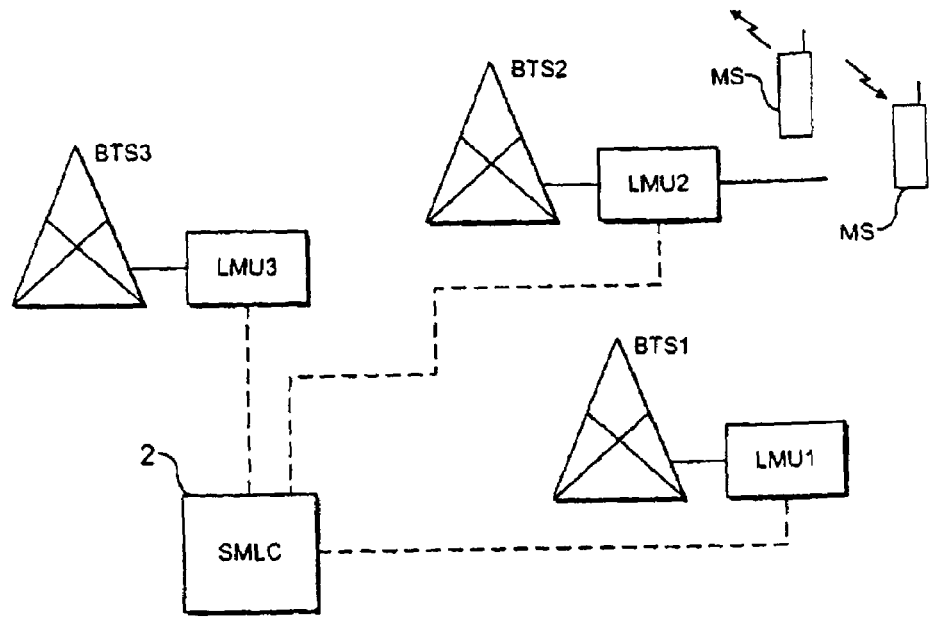
FIG. 1 is a schematic block diagram of relevant components of a mobile communication network.

FIG. 1 is a schematic diagram of the relevant components of a mobile communication network. The network comprises a plurality of base stations, three of which are illustrated referenced BTS1, BTS2, BTS3. It will be apparent that there will be a large number of base stations in the network, organised in any known way. Each base station carries one or more transmitter arranged to transmit signals on different channels (e.g. frequency, timing). At least some, if not all, base stations in the network are associated with respective location measurement units (LMUs), referenced herein LMU1, LMU2 and LMU3 corresponding to the appropriate base stations. A serving mobile location centre SMLC 2 is located in the network and is in communication with the location measurement units. This communication can be via a fixed line or a radio channel. Each location measurement unit LMU is connected to its associated base station to receive signals either transmitted from their own associated base station or from other base stations. For the purpose of receiving signals each LMU is equipped with a receiver for receiving radio signals across the air interface. It will also be apparent that there will be a number of mobile stations in the network, in communication with the base stations via radio signals. By way of example, two mobile stations MS1, MS2 are illustrated.

Techniques for location measurement have already been discussed. It is necessary for these measurements to use pairs of base stations whose signals are measurable by a particular LMU for locating the mobile. To that end, each base station and its associated LMU need to have a list of neighbouring base stations, a so-called neighbour (nbor) list, which indicates which pairs of base stations can readily be utilised by an LMU in any particular circumstance. This neighbour list is stored at the SMLC as will become clearer later.

Figure 2:
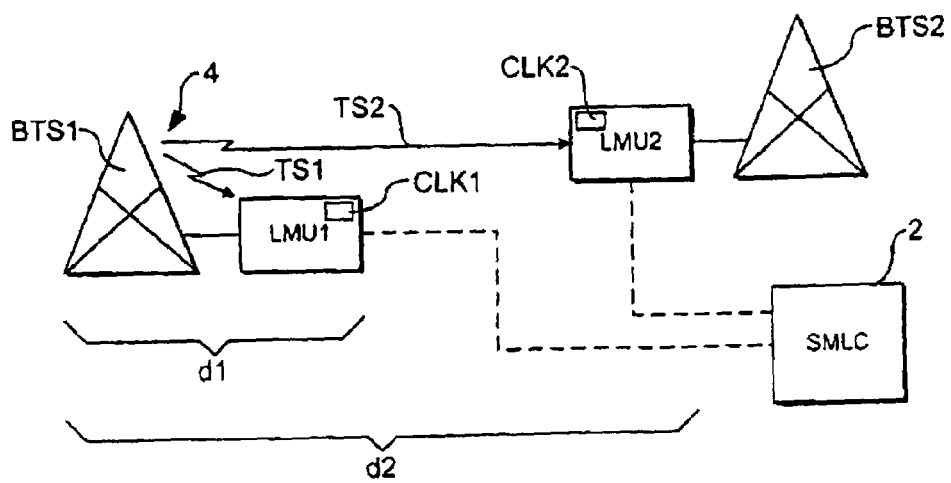
FIG. 2 is a schematic diagram illustrating the LMU candidate measurement technique.

FIG. 2 is a schematic diagram illustrating how a neighbour list can be automatically compiled. FIG. 2 illustrates a first base station BTS1 associated with a first location measurement unit LMU1, and a second base station BTS2 associated with a second location measuring unit LMU2. The distance $d_1$ is the distance between the first base station BTS1 and the first location measuring unit LMU1. $d_2$ is the distance between the first base station BTS1 and the second location measuring unit LMU2. These distances are held at the SMLC 2. Each location measuring unit LMU1, LMU2 is provided with an internal clock CLK1, CLK2 which are controlled using some global timing system, for example GPS. It is important that these clocks are accurate and synchronized. The LMUs are instructed by the SMLC 2 to measure a test signal 4 from the first base station BTS1, for example a control signal such as BCCH which is received by the first location measuring unit LMU1 along path TS1 and by the second location measurement unit LMU2 along path TS2. The time stamps at these location measurement units are referred to herein as $\overline{AT}$. The time stamp at LMU1 is $\overline{AT}1$ and the time stamp at LMU2 is $\overline{AT}2$. The transmission time (absolute time AT) from the first base station BTS1 can be calculated at the SMLC using the formula:

$$AT = \overline{AT} - d/c,$$

where d is the distance $d_1$ or $d_2$ accordingly, and c is the speed of radio waves in air, and $\overline{AT}$ is the corresponding time stamp $\overline{AT}1$ or $\overline{AT}2$ respectively. The correspondingly obtained transmission times AT1, AT2 are compared with each other at the SMLC 2. If they are the same, this means that both of the transmission paths TS1, TS2 for the test signal 4 are direct line of sight paths without excessive multipath effects or interference. Of course, there may be a small difference between the determined transmission times, due to errors etc and it is necessary to determine a predetermined range of differences that is satisfactory. Once this range has been determined, the SMLC 2 can automatically accept or reject candidate LMUs for the neighbour list based on these results.

Figure 3:
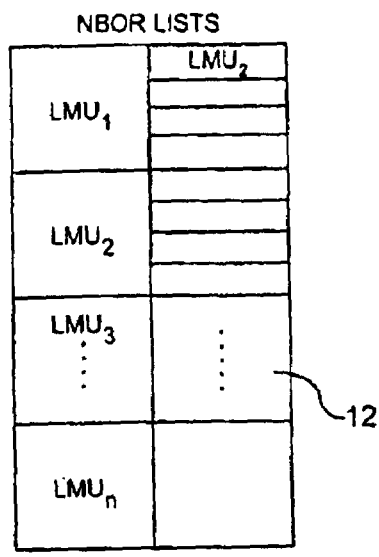
FIG. 3 is a diagram illustrating a neighbour list.

FIG. 2 illustrates a situation where a test signal 4 is sent to two LMUs. Of course, it is possible to send the test signal simultaneously to any number of LMUs and to compare the results from any of these LMUs. FIG. 3 illustrates the neighbour lists 12 for each LMU. The LMUs on the left hand side are considered to be the target LMU in each case, and the list of possible candidate LMUs on the right hand side are its acceptable neighbours or useful neighbours. The procedure described above can be implemented for each base station in turn to determine the neighbour lists. That is, transmission of the test signal from the first base station BTS1 determines the neighbour list for LMU1. Transmission of a test signal from the second base station BTS2 would determine the neighbour list for the location measuring unit LMU2 and so on.

Figure 4:
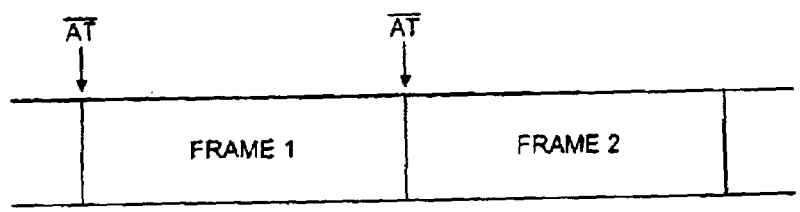
FIG. 4 is a diagram illustrating frame structure for a radio signal.

As is known, radio signals in a communication network generally have a frame structure, each frame containing data symbols and control symbols and having a certain frame length. Such a frame structure is illustrated in FIG. 4. To improve the accuracy of the measurements, the time stamping carried out at the LMUs can be carried out for a sequence of measurements, with the measured time taking into account the frame times. In this way, the accuracy of the received time, and consequently the calculated transmission time can be improved. It is also possible to take a number of results of the transmission time from a sequence of test signals and to take an average of them, once again to improve the reliability of the results.

Figure 5:
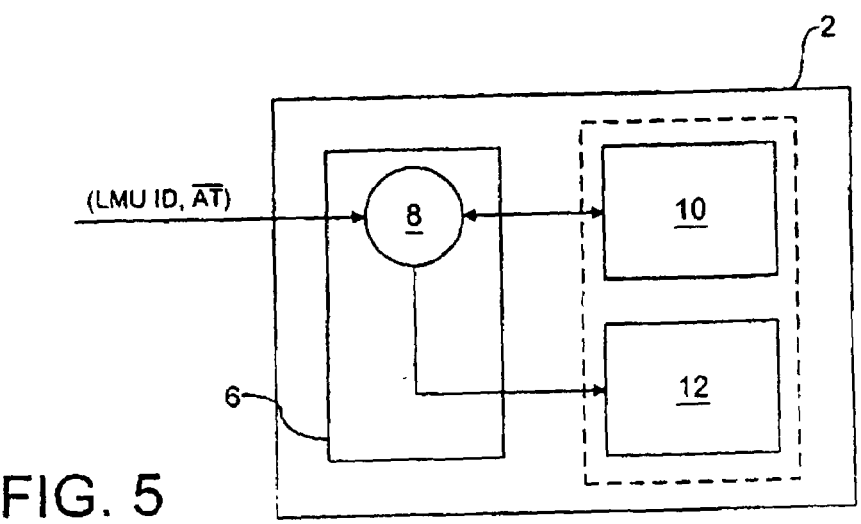
FIG. 5 is a schematic diagram illustrating a serving measurement location centre.

FIG. 5 is schematic flow diagram of the relevant components of the SMLC 2. The SMLC 2 includes a microprocessor 6 arranged to execute a computer program 8 for implementing the calculation and comparison steps described above. The SMLC 2 also includes a memory which holds, amongst other things, data 10 defining the distances of each of the location measuring units from the base stations and the neighbour lists denoted 12. The SMLC receives for each measurement the identity of the location measuring unit LMUID together with the time stamp of the test signal $\overline{AT}$. The LMUID is used to extract the distance d from the data 10 and the program 8 then calculates the transmission time AT. As data from subsequent LMUs is received, this transmission time is compared with subsequently calculated transmission times and a comparison performed. Accepted LMUs are placed on a neighbour list 12 and rejected LMUs are discarded.

Figure 6:
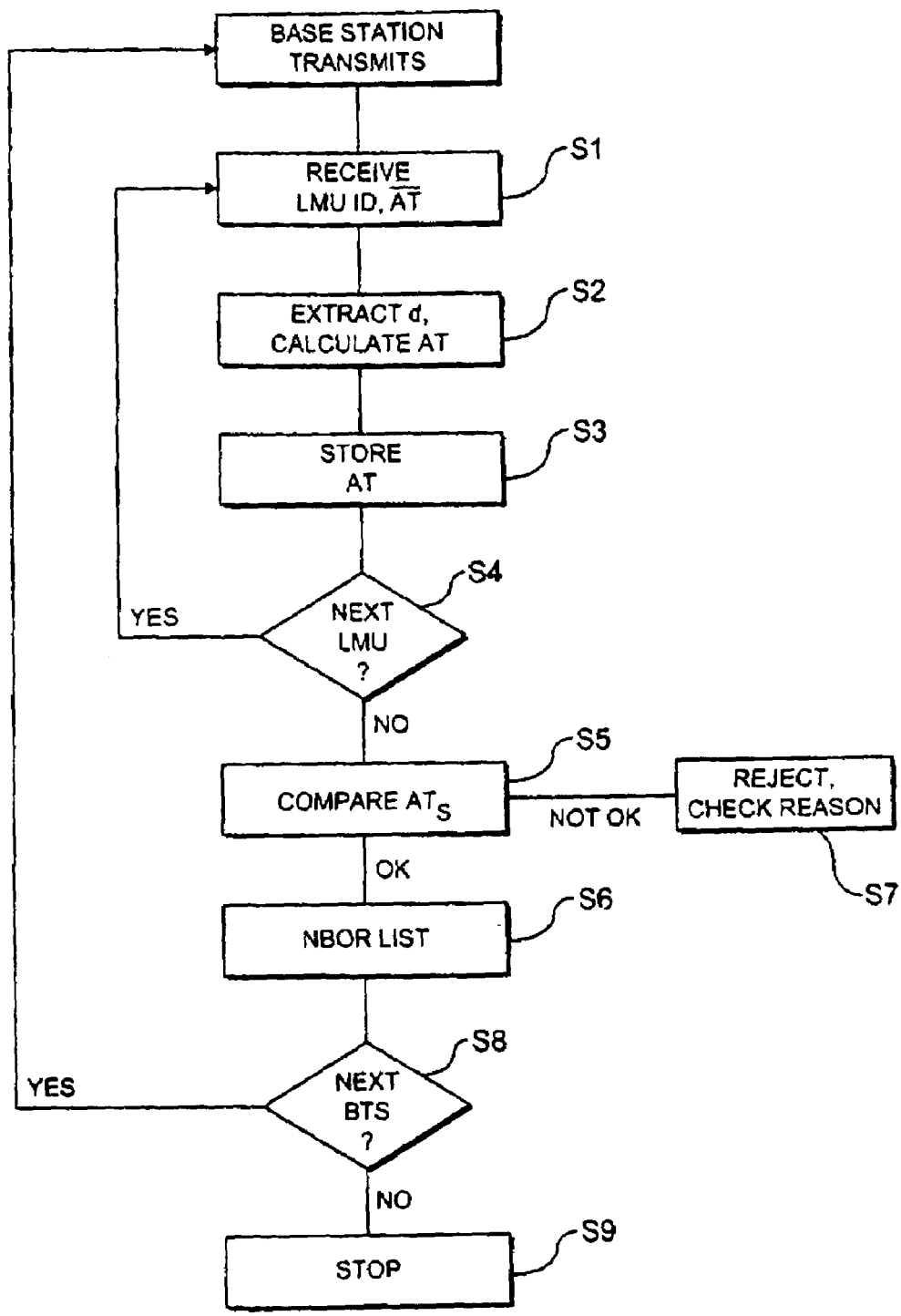
FIG. 6 is a flow chart illustrating process steps to obtain the neighbour list illustrating process steps to obtain the neighbour list.

FIG. 6 is a flow chart illustrating the salient points of the method. Note that FIG. 6 does not illustrate the various averaging and multiple measurement steps which would generally take place in a practical implementation to ensure accuracy. At step S0 the first base station is instructed to transmit a test signal. At step S1, the LMUID and the associated time stamp $\overline{AT}$ is received. At step S2, the distance d is extracted from the data 10 and the transmission time AT is calculated for that LMU. That transmission time is stored at step S3 in the memory of the SMLC 2. A check is carried out at S4 to see whether or not there is a next LMU waiting to send its data. If so, the steps S1 to S3 are carried out again. If not, the transmission time which has been calculated is compared with the transmission time calculated for earlier LMUs. If the result is OK, that is they are the same or within a small predetermined range, that LMU is placed on the neighbour list for the transmitting base station.

If it is not OK, it is rejected and reasons for that rejection might then be checked. A check is then carried out at step S8 to see whether all the base stations which are to be included in the survey have been included. If they have not, then the next base station is caused to transmit a test signal (step S0). If they have, the process is stopped at step S9.

If there is a systematic error in the calculated transmission times AT for a particular pair of LMUs, it may be possible to use that systematic error as a correction parameter so that the pair can still be considered neighbours, but with the application of that constant parameter. This could mean for example that there is a persistent but constant reflection in the path.

Also, the method can be used for checking the coordinates of base stations. If none of the LMUs can measure certain base stations, that is the calculated transmission times never come close to each other, then it may indicate (amongst other possibilities) that there is something wrong with the distances which have been given for the calculations, and consequently something wrong with the coordinates for the base station.

As described above, the timing information collected and determined by a target LMU is compared to timing information collected and determined by surrounding LMUs in order to create the neighbour list. Qualification for inclusion on the neighbour list requires adjacent LMUs to be able to accurately identify transmission times from the target BTS. In order for the LMU to do this, the signal needs a clear, approximate and unobstructed path of travel. Sometimes an LMU can have difficulties to measure its own associated base station, for example because of poor installation of the LMU's antenna. Therefore, it may not be sensible to use it as the only reference to which all the other LMU's measurements (for that base station) are compared. To deal with this, measurements from all LMUs may be combined into one "reference AT value" and all the measurements (including the ones measured by the LMU associated with that particular base station) should be compared to that reference AT value. This allows a proper determination that all neighbour candidates on the list do qualify.

In order to create this reference value, a weighted averaging is utilised, that is by applying to each AT value a weight for the relevant LMU. These weights can be determined for example based on deviation of measurements, signal reception levels, etc.

It will be appreciated that this invention can also be utilised with assisted GPS (A-GPS), a technology which has been developed in connection with the well known satellite-based location system called GPS (global positioning system). A-GPS has been developed in order to increase the sensitivity of the GPS receiver in the mobile and to speed up the time to first fix (TTFF). In A-GPS, the cellular network sends a systems data (satellite information, time information, rough location of the receiver, etc) to the GPS receiver. In order to measure timing information, the SMLC of the network requests the LMUs to measure timing information (AT measurements) for a certain list of BTSs. The protocol for obtaining this timing information in GSM is the same as it is for E-OTD.

The timing information given as assistance data to the GPS capable mobile can be either only the GPSTOW, or the GPSTOW tied to air interface timing of the cellular network. The latter, also known as time stamping of cell frames, consists of a very accurate (less than 200 ns) GPS time stamp for the moment when a signal left the cellular networks transmitter antenna. This time stamp is defined in practice as the starting moment of a frame, so a frame number and the GPS time stamp define the relation between cellular network timing and GPSTOW. By knowing this relationship accurately enough, the A-GPS enabled mobile can obtain better sensitivity and improved TTFF indicating the GPSTOW when a specific frame left the base station transmitter antenna. With the aid of this cell frame timing, the mobile can then calculate the real time GPSTOW.

What is claimed is:

1. A method of compiling a list of usable neighbour location measurement units in a mobile communications network, the method comprising:
   (a) receiving a signal from one of a plurality of transmitters at each of a set of location measurement units and time stamping the signal with the arrival time at each location measurement unit;
   (b) determining from the arrival time at each location measurement unit and its distance from the transmitting transmitter the transmission time;
   (c) comparing the transmission times determined for each of the location measurement units and placing on the list only those location measurement units whose transmission times fall in a predetermined range of one another,
   wherein the mobile communications network comprises a plurality of transmitters with a plurality of location measurement units.

2. A method according to claim 1, wherein (a) to (c) are carried out for each transmitter.

3. A method according to claim 2, when carried out for a predetermined sequence of transmitters at predetermined time intervals.

4. A method according to claim 2, when carried out using a computer program executed on a processor.

5. A method according to claim 2, when carried out at a serving location measurement centre in the network.

6. A method according to claim 1, wherein said time stamping is carried out using a global clock.

7. A method according to claim 1, which comprises identifying one of said set of location measurement units as a target location measurement unit associated with said transmitter;
   comparing the transmission times for the remaining ones of the set of location measurement units with the transmission time for the target location measurement unit; and
   only placing the target location measurement unit on the list if its transmission time falls in said predetermined range.

8. A method according to claim 1, wherein each transmitter is associated with a base station.

9. A method according to claim 1, further comprising checking coordinates of a transmitter using the transmission times.

10. A method according to claim 7, wherein said target location measurement is identified as the location measurement unit physically located at said transmitter.

11. A serving measurement location centre in a mobile communications network, the centre comprising:
    a processor arranged to receive from each of a set of the location measurement units receiving a signal from one of the transmitters a transmission time calculated at the respective measurement units;
    a store holding a list of useful location measurement units;
    said processor being programmed to compare the transmission times determined at each of the location measurement units and to place on the list only the location measurement units whose determined transmission times fall in a predetermined range of one another
    wherein the communications network includes a plurality of transmitters and a plurality of location measurement units.

12. A serving measurement location centre according to claim 11, wherein the processor is arranged to receive a signal from each of the transmitters.

13. A serving measurement location centre according to claim 12, wherein the processor is arranged to receive a signal from a predetermined sequence of transmitters at predetermined time intervals.

14. A serving measurement location centre according to claim 11, wherein the processor is programmed to identify one of said set of location measurement units as a target location measurement unit associated with said transmitter, to compare the transmission times for the remaining ones of the set of location measurement units with the transmission time for the target location measurement unit, and only placing the target location measurement unit on the list if its transmission time falls in said predetermined range.

15. A serving measurement location centre according to claim 11, wherein said transmitters are located at base stations.

16. A serving measurement location centre according to claim 14, wherein said target location measurement unit is physically located at said transmitter.

17. A serving measurement location centre according to claim 11, comprising a data store holding data defining the distances of each of the location measurement units from said transmitter.

18. A serving measurement location centre according to claim 17, which comprises a calculator configured to calculate said transmission times based on said distance data.

19. A computer program embodied on a computer readable medium, said computer program comprising program code which, when executed on a processor causes the processor to receive from each of a set of location measurement units associated with the base stations a transmission time calculated at the respective location measurement unit, and to further cause the processor to compare the transmission times determined at each of the location measurement units and to place on a list of usable neighbour location measurement units only those whose transmission times fall in a predetermined range of one another.

20. A serving measurement location centre in a mobile communications network, the serving location measurement centre comprising:
    a processor means for receiving from each of a set of location measurement units receiving a signal from one of a plurality of transmitters, a transmission time calculated at the respective measurement units;
    a storage means for holding a list of useful location measurement units;
    said processor means being programmed to compare the transmission times determined at each of the location measurement units and to place on the list only the location measurement units whose determined transmission times fall in a predetermined range of one another,
    wherein the communications network includes a plurality of transmitters with a plurality of location measurement units.

* * * * *